US009292008B1

(12) United States Patent
Ahamed et al.

(10) Patent No.: US 9,292,008 B1
(45) Date of Patent: Mar. 22, 2016

(54) WATCHBAND WITH INTEGRATED ELECTRONICS

(71) Applicant: MainTool, Bezons (FR)

(72) Inventors: Hussain Ahamed, Gouvieux (FR); Boris Kesler, Lamorlaye (FR); Arjaldo Karaj, Bremen (DE); Ángel Sánchez, Madrid (ES); Gabriela de la Serna, Madrid (ES)

(73) Assignee: MainTool, Bezons (FR)

( * ) Notice: Subject to any disclaimer, the term of this patent is extended or adjusted under 35 U.S.C. 154(b) by 0 days.

(21) Appl. No.: 14/615,961

(22) Filed: Feb. 6, 2015

(51) Int. Cl.
| | |
|---|---|
| *G04G 17/00* | (2013.01) |
| *G04G 21/00* | (2010.01) |
| *A44C 5/00* | (2006.01) |
| *H04B 1/3827* | (2015.01) |
| *H04M 1/21* | (2006.01) |
| *G04G 21/02* | (2010.01) |
| *G04G 21/04* | (2013.01) |
| *G04B 37/00* | (2006.01) |
| *G04G 17/04* | (2006.01) |

(Continued)

(52) U.S. Cl.
CPC ............ *G04G 21/025* (2013.01); *A44C 5/0015* (2013.01); *A44C 5/14* (2013.01); *G04B 37/0008* (2013.01); *G04G 17/04* (2013.01); *G04G 21/04* (2013.01); *H04B 1/3888* (2013.01); *H04M 1/21* (2013.01)

(58) Field of Classification Search
CPC ... G04B 37/0008; G04G 17/04; G04G 21/04; G04G 21/025; A44C 5/0015; A44C 5/14; H04B 2001/3866; H04B 1/3888; H04M 1/21

USPC .................................................... 368/13, 282
See application file for complete search history.

(56) References Cited

U.S. PATENT DOCUMENTS

| | | | | |
|---|---|---|---|---|
| 4,023,347 A | * | 5/1977 | Haber | .................... G04G 17/08 368/224 |
| 4,406,290 A | | 9/1983 | Walbeoffe-Wilson | |
| 4,779,249 A | * | 10/1988 | Rappaport | ......... G04B 37/1486 224/178 |

(Continued)

FOREIGN PATENT DOCUMENTS

| | | |
|---|---|---|
| CN | 101036577 | 9/2007 |
| CN | 102525439 | 7/2012 |

(Continued)

OTHER PUBLICATIONS

WOTCH http://smartwatch.me/t/wotch-transform-your-watch-into-a-smart-device/590.

(Continued)

*Primary Examiner* — Vit W Miska
(74) *Attorney, Agent, or Firm* — Pepper Hamilton LLP

(57) ABSTRACT

A watchband with integrated electronics designed to be attachable to any standard mechanical or digital timepiece. The watchband has a flexible circuit board sandwiched between layers of watchband material, allowing for the flexibility of a normal watchband with the electronics capability of a mobile computer and fitness tracker. The watchband has an embedded heart rate sensor, body temperature sensor, ambient temperature sensor, vibration generator, inertial sensors, and wireless communication device. The watchband is powered by a rechargeable battery, which is recharged using a charging port that can be connected to a battery charger.

19 Claims, 18 Drawing Sheets

(51) Int. Cl.
*A44C 5/14* (2006.01)
*H04B 1/3888* (2015.01)

(56) References Cited

U.S. PATENT DOCUMENTS

| | | | | |
|---|---|---|---|---|
| 5,050,142 | A | | 9/1991 | Gibbs |
| 5,179,733 | A | * | 1/1993 | Matsui ............... H01Q 1/273 368/282 |
| 5,303,421 | A | * | 4/1994 | Goldenberg ......... H04B 1/086 24/265 WS |
| 5,526,006 | A | * | 6/1996 | Akahane ......... B29C 45/14065 224/165 |
| 5,742,256 | A | * | 4/1998 | Wakabayashi ....... H01Q 1/273 224/178 |
| 5,807,267 | A | | 9/1998 | Bryars et al. |
| 5,810,736 | A | | 9/1998 | Pail |
| 6,491,647 | B1 | | 12/2002 | Bridger |
| 6,960,016 | B2 | * | 11/2005 | Apotheloz ........... G04G 17/083 224/165 |
| 7,463,205 | B2 | | 12/2008 | Turner |
| 7,722,245 | B2 | * | 5/2010 | Baba ................... G04G 17/08 368/281 |
| 8,073,548 | B2 | | 12/2011 | Colvin |
| 8,260,405 | B2 | | 9/2012 | Aarts |
| 8,482,909 | B2 | * | 7/2013 | Douglas ............. A44C 5/0015 361/679.03 |
| 8,604,923 | B1 | | 12/2013 | Alvarez |
| 8,784,271 | B2 | | 7/2014 | Brumback |
| 2003/0066308 | A1 | | 4/2003 | Radley-Smith ...... A44C 5/0015 63/3 |
| 2008/0002527 | A1 | * | 1/2008 | Ishii .................... G04G 9/0035 368/239 |
| 2008/0037374 | A1 | * | 2/2008 | Chu .......................... G04G 9/02 368/82 |
| 2014/0121471 | A1 | | 5/2014 | Walker |
| 2014/0275852 | A1 | | 9/2014 | Hong |
| 2015/0192903 | A1 | * | 7/2015 | Vondle ................. G04G 17/08 368/317 |
| 2015/0313542 | A1 | * | 11/2015 | Goldberg ............... A61B 5/681 600/384 |
| 2015/0378391 | A1 | * | 12/2015 | Huitema ................ G06F 1/163 361/679.03 |

FOREIGN PATENT DOCUMENTS

| | | |
|---|---|---|
| CN | 103876722 | 6/2014 |
| EP | 1145085 | 1/2000 |
| EP | 1859730 | 11/2007 |
| FR | 2894451 | 6/2007 |
| KR | 101395614 | 12/2013 |
| WO | WO2013042070 | 3/2013 |

OTHER PUBLICATIONS

Kairos T-Band, http://kairostband.com/#specs.
Kairos T-Band, https://www.indiegogo.com/projects/kairoswatchestbandanalogwatchbecomessmart.
Kairos T-Band, http://www.digitaltrends.com/wearables/kairossmartwatchbandsnewscampaign/.
Kairos T-Band, http://www.ablogtowatch.com/kairostbandstrapscreenturnswatchsmartwatch/.
Modillion, http://www.gizmag.com/modilliansmartwatchstrap/32059/.
Montblanc, http://www.macrumors.com/2015/01/02/montblanc-estrap/.
Montblanc, http://mobilemarketingmagazine.com/montblanc-unveils-smart-watch-strap/.
Glance, http://www.dailymail.co.uk/sciencetech/article-2658846/Turn-ANY-watch-smartwatch-40-attachment-connects-phone-calls-texts-everyday-timepieces.html.

\* cited by examiner

WATCHBAND WITH INTEGRATED ELECTRONICS

FIELD OF THE INVENTION

The present device relates to a watchband that, in addition to being able to be attached to any mechanical or digital timepiece, has integrated electronics capable of diverse functionalities and interactions with a multitude of digital devices.

BACKGROUND

Wearable computing has become a prevalent step forward in the progress of technology. Consumers are searching for greater and greater opportunities to integrate technology with everyday wearable items such as glasses, necklaces, and bracelets. Many products on the market today connect to a user's mobile device and allow for the pushing of notifications, answering emails and text messages, as well as the basic functions of keeping time and screening calls.

An additional trend being seen is the rise of digital fitness trackers. Fitness tracking devices are commonly worn around the wrist, neck, or on the ear, and combine specialized sensors to detect motion, steps taken, and heart rate. More advanced models can combine sensors with computing algorithms to provide a user with respiration rates, calories burned, sleep cycle analyses, and general metabolic information. Many of the fitness trackers currently on the market allow for a user to upload and share fitness data to a computer or a social network, allowing for the tracking of a user's fitness data over time.

In spite of the rising popularity of both wearable computers and fitness trackers, the wristwatch still remains a popular fashion accessory. Wristwatches can be a triumph of mechanical design, having hundreds, even thousands, of moving parts. Many luxury watches have the mechanical ability to display far more than the hours and the minutes; extra features, such as tracking eclipses or planetary motions, are termed "complications" in horology, the study of watches and clocks. Timepieces convey status and wealth, fashion and taste, and a sense of punctuality. And while many of the above mentioned wearable computers or fitness trackers seek to emulate clocks or watches on their central displays, none can replicate the mechanical intricacy or aesthetic elegance of a luxury timepiece. What is needed is a watchband with integrated electronics that can provide the same functionality of a wearable computer or fitness tracker, but able to be attached to a user's desired mechanical or digital timepiece such that the timepiece's aesthetics and functionality are not impaired.

SUMMARY OF THE INVENTION

It is an aspect of the disclosure to provide an improved watchband with integrated electronics. These together with other aspects and advantages, which will be subsequently apparent, reside in the details of construction and operation as more fully hereinafter described and claimed, reference being had to the accompanying drawings forming a part hereof, wherein life numerals refer to like parts throughout.

A BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which:

DETAILED DESCRIPTION

Figure 1:
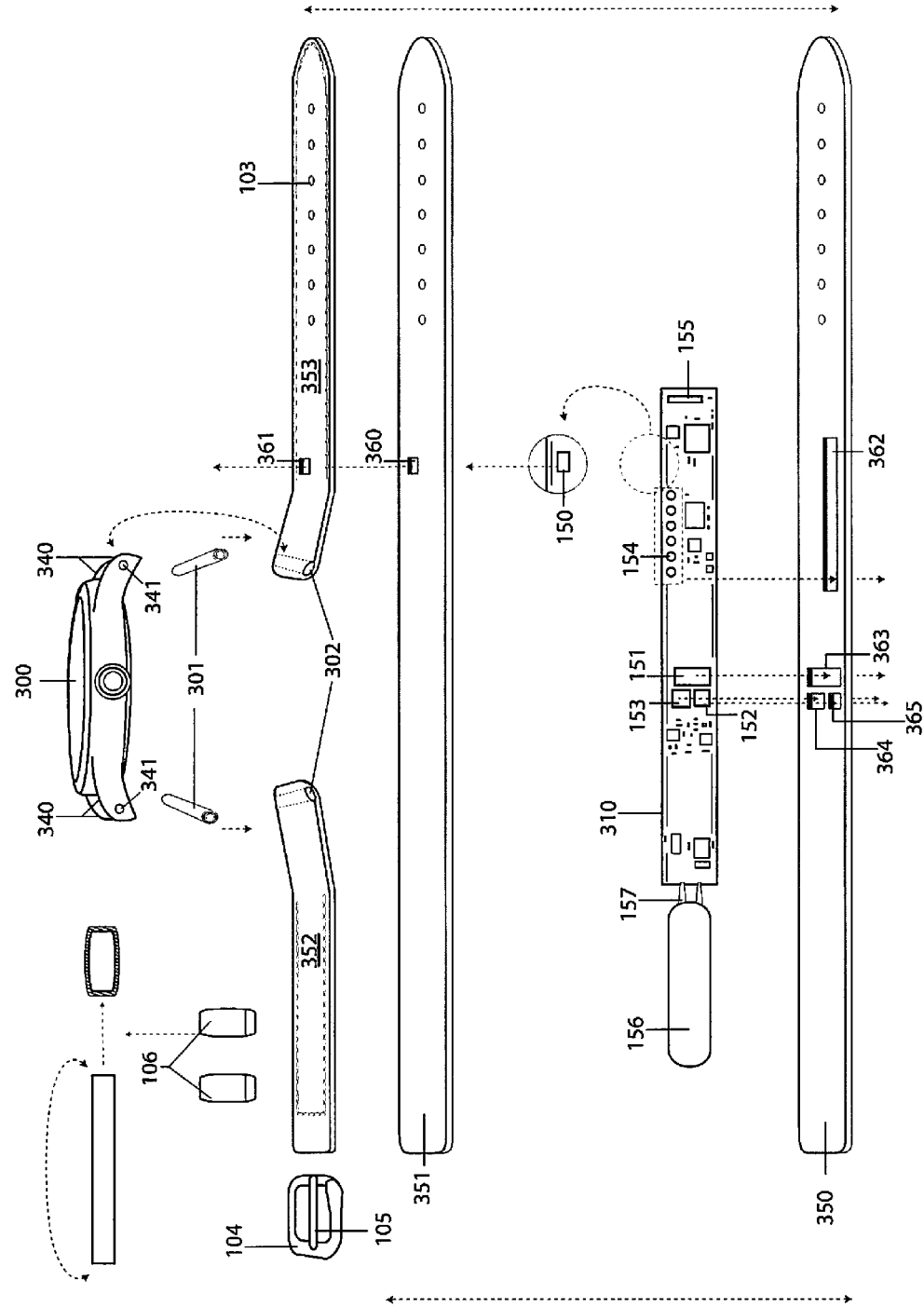
FIG. 1 is an exploded view of a watchband with integrated electronics with a timepiece, according to an embodiment.

The present invention relates to a watchband with integrated electronics. Specifically, the invention seeks to emulate the functionality of wearable computers and personal fitness trackers, but allows a user to continue to use a mechanical (analog) or digital timepiece. Thus, the integrated electronics can be entirely located in the watchband itself, with the mechanical or digital timepiece being interchangeable according to the user's preference without a loss of functionality or performance. In a primary embodiment, the watchband's integrated electronics can be configured to wirelessly interact with a user's mobile device, which can include smartphones, PDAs, personal computers, vehicles, or other electronic devices with wireless or cellular capabilities.

The watchband (and its parts) can be created using a variety of watchband materials, including, but not limited to, leather, silicone, metal, fabric, plastic, rubber, composite materials, or a combination thereof. The watchband can be constructed using a body-contacting layer of watchband material, an outer layer of watchband material, and, in some embodiments, one or more timepiece connection layers of watchband material. The watchband material layers can be connected using needlepoint, glue, heat bonding, adhesives, or other connection means. In addition to the internal electronics, the watchband can include a tang-type clasp with tang and tang holes for adjustment on the wrist, along with excess strap loops to secure any extra portion of the strap after the user puts on the watch. Alternate embodiments of the wristband can have a deployant-type clasp, either inside style or outside style, or a buckle clasp in place of the tang-type clasp.

By using the layered construction technique, a flexible circuit board can be placed in between the body-contacting and outer layers of the watchband material, such that the flexible circuit board, and its associated electronics, can remain safe from weather and wear. A flexible circuit board can be a printed circuit board that allows for the same level of electrical connection fidelity between components as a regular circuit board, but can be manufactured out of materials such as polyimide, polyether ether ketone, polyester, polyethylene napthalate, polyetherimide, or copolymer polyimide films, allowing for the circuit board to be able to bend and flex dramatically more than a regular surface board would allow whilst still retaining those electrical connections. The flexible circuit board can have preprinted connection points for the soldering of components for ease of manufacturing. Embedded on the flexible circuit board can be a variety of sensors devoted to the measurement of various bodily functions, health criteria, and device information. These sensors can be connected to a central microprocessor, which can be used as the computational hub of the watchband.

In an embodiment, the watchband can have an integrated heart rate sensor connected to the flexible circuit board. The heart rate sensor can be a photoplethysmograph optical sensor, which uses a light-emitting diode (LED) and a photodiode in conjunction in order to measure changes in blood flow, similar to the heart rate measurement system described in U.S. Pat. No. 4,258,719, herein incorporated by reference in its entirety. As light shines through the user's skin, its detected intensity changes as the amount of blood flow changes during a heart's systolic and diastolic function. These intensity changes can be read by the photodiode. The photodiode signal can be amplified with a low gain transimpedance amplifier, producing a voltage signal. In an embodiment, the signal gain can be kept low so as to reduce signal noise in the amplification stage. To filter noise, the signal can be passed through a low-pass second order filter, followed by a low-cutoff frequency high-pass filter, and followed again by a second low-pass filter to remove any remaining noise. All filters can be built with operational amplifiers (op-amps). In order for the heart rate monitor to function, a LED hole and a photodiode hole can be made on the body-contacting layer of watchband material.

In addition to the heart rate sensor, the watchband can have two temperature sensors embedded on the flexible circuit board. One temperature sensor can lie on the side of the watchband facing the user's skin, and be used to continuously monitor the user's body surface temperature. The second sensor can lie on the side of the watchband facing opposite the user's wrist, and be used to continuously monitor the ambient temperature. In order for the temperature sensors to function, a body temperature sensor hole can be cut into the body-contacting layer of watchband material, and an ambient temperature sensor hole can be cut into the outer layer of watchband material. If needed, an ambient temperature sensor hole can also be cut into the timepiece connection layer of watchband material. Both temperature sensors can be thermocouples, thermistors, semiconductors, digital integrated sensors, or a combination thereof.

The watchband can have a wireless communication device for communications between the watchband and the user's mobile device. The user's mobile device can include a cellular phone, personal computer, tablet, medical device, internet router, integrated telemetry device, or other wirelessly communicating device. The wireless communication device can be a Bluetooth transceiver, an IEEE 802.11 transceiver, radio transceiver, or other wireless communication mechanism. The wireless communication device can have a small physical profile, low power consumption, and durable construction.

The watchband can be powered by a rechargeable battery. The rechargeable battery can be lithium-ion, lithium-polymer, nickel-cadmium, nickel-hydrogen, nickel-zinc, thin film lithium, or other metallic combination thereof. The battery can be small in profile, and able to hold a charge for an extended period of time. The battery can be recharged using a battery charger, which can interact directly with the watchband at a charging port, which can be a series of metal contacts. The battery charger can be connected to the charging port using magnets, physical clasps, or wireless induction. To keep the charging port and the metal contacts accessible, a charging port hole can be cut on the body-contacting or outer layer of the watchband material. In order to maintain performance of the watchband at various states of charge, a buck-boost DC-DC converter can be used to keep the output voltage constant. Alternatively, a power management circuit (PMIC) can be included in the watchband in place of the buck-boost DC-DC converter, which can regulate battery charging, voltages rates, activation control, and other features.

Any standard mechanical or digital timepiece can be used with the watchband. The timepiece can be held in place by timepiece joints hidden within connection channels located on the timepiece connection layer of watchband material. The timepiece joints can be hollow tubes, with sufficient diameter to admit a screw or pin. The timepiece, which can have mounting supports, can fit such that the timepiece connection channels, having the timepiece joints inside, align with the mounting supports. The user can add the screws or pins in order to secure the timepiece to the timepiece joints and the timepiece connection layer. In order to change out the timepiece, the user would remove the screws or pins, replace the timepiece with an alternate timepiece, and re-add the screws or pins.

FIG. 1 is an exploded view of a watchband with integrated electronics with a timepiece 300, according to an embodiment. The watchband can be created using a variety of watchband materials, including, but not limited to, leather, silicone, metal, fabric, plastic, rubber, composite materials, or a combination thereof. The watchband can be constructed in a layered manner, having a body-contacting layer of watchband material 350, an outer layer of watchband material 351, a first timepiece connection layer 352 and a second timepiece connection layer 353 of watchband material. The watchband material layers 350, 351, 352, 353 can each be different materials, and can be connected using needlepoint, glue, heat bonding, adhesives, or other connection means. The body connecting layer 350 can be connected to the outer layer 351 with the flexible circuit board placed in between, while the first timepiece connection layer 352 and the second timepiece connection layer 353 can be connected on top of the outer layer 351. The first timepiece connection layer 352 and the second timepiece connection layer 353 can be connected at a distance of a timepiece length. A timepiece length can be the space needed to admit a standard analog or digital timepiece. Alternatively, the watchband material layers can be molded as a single piece, with the flexible circuit board 310 embedded within. In addition to the internal electronics, the watchband can include a tang-type clasp 104 with tang 105 and tang holes 103 for adjustment on the user's wrist (not shown), along with excess strap loops 106 to secure any extra portion of the strap after the user puts on the assembled watch (not shown). Alternate embodiments of the wristband can have a deployant-type clasp (not shown), either inside style or outside style, or a buckle clasp (not shown) in place of the tang-type clasp 104.

By using the layered construction technique, a flexible circuit board 310 can be sandwiched and sealed in between the body-contacting layer 350 and outer layer 351 of the watchband material, such that the flexible circuit board 310 and its associated electronics can be protected from weather and wear. The flexible circuit board 310 can be a printed circuit board that allows for the same level of electrical connection fidelity between components as a regular circuit board, but can be manufactured out of materials allowing for the circuit board to be able to bend and flex dramatically more than a regular surface board would allow whilst still retaining those electrical connections. The flexible circuit board 310 can have preprinted connection points for the soldering of components for ease of manufacturing. Embedded on the flexible circuit board 310 can be a variety of sensors devoted to the measurement of various bodily functions, health criteria, and device information. These sensors can be connected to a central microprocessor (not shown), which can be used as the computational hub of the watchband.

In an embodiment, the watchband can have an integrated heart rate sensor connected to the flexible circuit board 310. The heart rate sensor can be a photoplethysmograph optical sensor, which uses a light-emitting diode (LED) 152 and a photodiode 153 in conjunction in order to measure changes in the user's blood flow. As light from the LED 152 shines onto the user's skin, its detected intensity changes as the amount of blood flow changes during the heart's systolic and diastolic function. These intensity changes can be read by the photodiode 153. The photodiode 153 signal can be amplified with a low gain transimpedance amplifier (not shown), producing a voltage signal. In an embodiment, the signal gain can be kept low so as to reduce signal noise in the amplification stage. To filter noise, the signal can be passed through a low-pass second order filter (not shown), followed by a low-cutoff frequency high-pass filter (not shown), and followed again by a second low-pass filter (not shown) to remove any remaining noise. The amount and order of filters can be changed to further alter the signal. All filters can be built with operational amplifiers (op-amps). In order for the heart rate monitor to function, a LED hole 364 and a photodiode hole 365 can be made on the body-contacting layer 350 of watchband material.

In addition to the heart rate sensor, the watchband can have two temperature sensors, a body temperature sensor 151 and an ambient temperature sensor 150, embedded on the flexible circuit board 310. The body temperature sensor 151 can face the side of the watchband facing the user's skin and be used to continuously monitor the user's body surface temperature. The ambient temperature sensor 150 can face the side of the watchband facing the world, and be used to continuously monitor the ambient temperature. In order for the temperature sensors 150, 151 to function, a body temperature sensor hole 303 can be cut into the body-contacting layer 350 of watchband material, and an ambient temperature sensor hole 360 can be cut into the outer layer of watchband material 351. If needed, an ambient temperature sensor hole 361 can also be cut into the second timepiece connection layer 361 of watchband material. When constructed, the ambient sensor holes 360, 361 can be aligned such that the ambient temperature sensor is exposed to the ambient air. Both temperature sensors 150, 151 can be thermocouples, thermistors, semiconductors, digital integrated sensors, or a combination thereof.

The watchband can have a wireless communication device 155 for communications between the watchband and a user's mobile device (not shown). The user's mobile device (not shown) can include a cellular phone, personal computer, tablet, medical device, internet router, integrated telemetry device, or other wirelessly communicating device. The wireless communication device 155 can be a Bluetooth transceiver, an IEEE 802.11 transceiver, radio transceiver, or other wireless communication mechanism. The wireless communication device 155 can have a small physical profile, low power consumption, and durable construction.

The watchband can be powered by a rechargeable battery 156, which can also be sandwiched between the body-contacting layer 350 and the outer layer 351 of watchband material. The rechargeable battery 156 can be lithium-ion, lithium-polymer, nickel-cadmium, nickel-hydrogen, nickel-zinc, thin film lithium, or other metallic combination thereof. The battery 156 can be small in profile, and able to hold a charge for an extended period of time. The battery 156 can be attached to the flexible circuit board 310 by a series of metallic battery connections 157. The battery 156 can be recharged using a battery charger (not shown), which can interact directly with the watchband at a charging port 154, which can be a series of metal contacts. The battery charger can be connected to the charging port using magnets, physical clasps, or wireless induction. To keep the charging port's 154 the metal contacts accessible, a charging port hole 362 can be cut on the body-contacting 350 or outer layer 351 of the watchband material. In order to maintain performance of the watchband at various states of charge, a buck-boost DC-DC converter (not shown) can be used to keep the output voltage constant. Alternatively, a power management circuit (PMIC) can be included in the watchband in place of the buck-boost DC-DC converter, which can regulate battery charging, voltages rates, activation control, and other features.

Any standard mechanical or digital timepiece 300 can be used with the watchband. The timepiece 300 can be held in place by timepiece joints 301 hidden within connection channels 302 located on the first connection layer 352 and second connection layer 353 of watchband material. The timepiece joints 301 can be hollow tubes, with sufficient diameter to admit a screw or pin (not shown), and can be made from plastic or metal. The timepiece 300, which can have mounting supports 340 having mounting holes 341, can fit such that the timepiece connection channels 302, having the timepiece joints 301 inside, align with the mounting support 340 and the mounting holes 341. The user can add the screws or pins to the mounting holes 341 in order to secure the timepiece 300 to the timepiece joints 301 and the timepiece connection layers 352, 353. In order to change out the timepiece 300, the user would remove the screws or pins from the mounting holes 341, replace the timepiece 300 with an alternate timepiece (not shown), and re-add the screws or pins to the alternate mounting holes (not shown).

Figure 2:
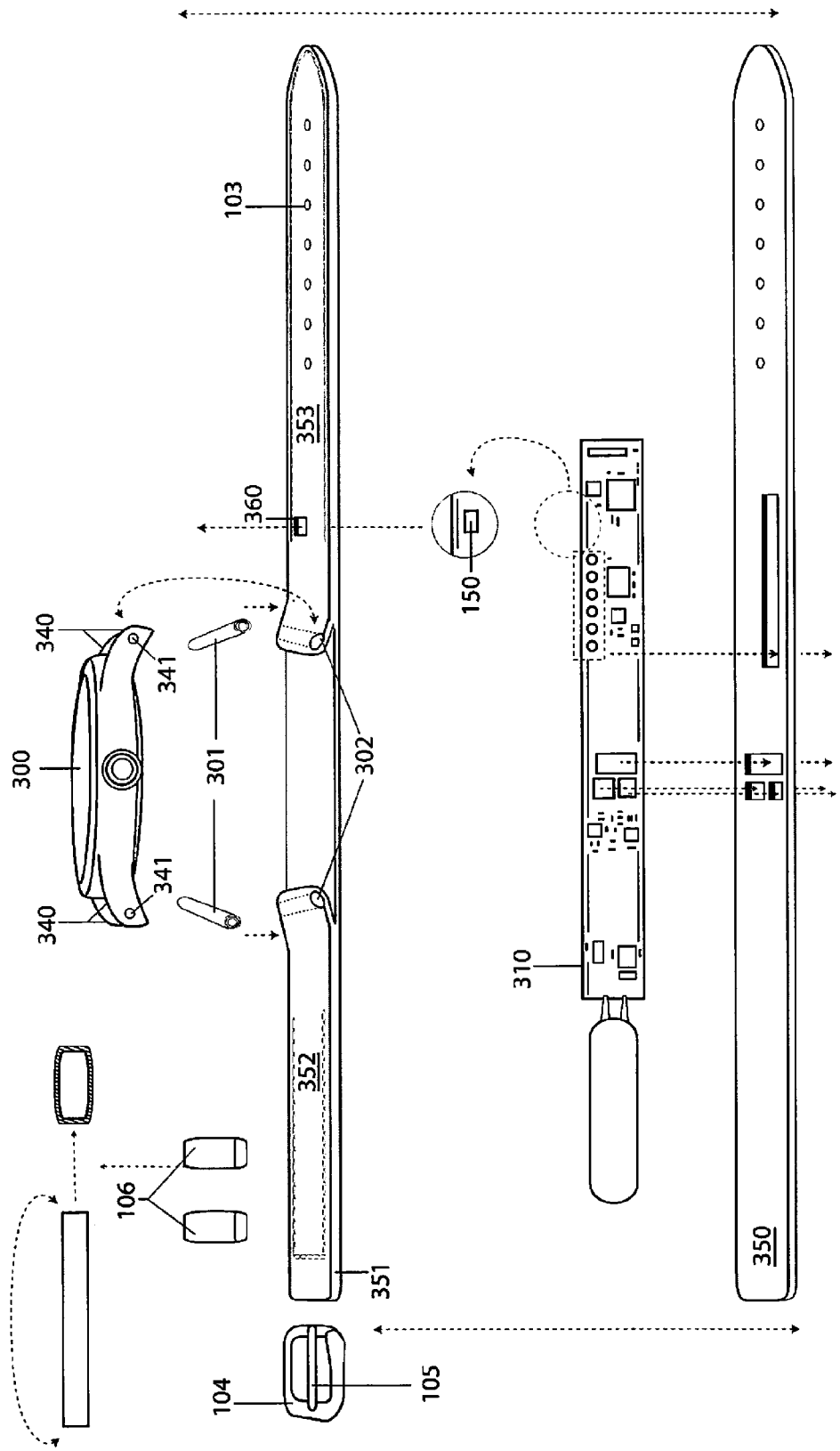
FIG. 2 is an exploded view of a watchband with integrated electronics with a timepiece, according to an alternate embodiment.

FIG. 2 is an exploded view of a watchband with integrated electronics with a timepiece, according to an alternate embodiment. In the alternate embodiment, the first timepiece connection layer 352 and second timepiece connection layer 353 of watchband material are molded as part of the outer layer 351 of watchband material, as opposed to the first embodiment shown in FIG. 1 where the first timepiece connection layer 352 and second timepiece connection layer 353 are separate layers that can be attached to the outer layer 351 of watchband material. This melding can occur when the watchband is made out of a molded material, such as plastics, silicone, or rubber. Because the second connecting layer 353 is melded with the outer layer 351 of watchband material, only a single ambient temperature sensor hole 360 is needed to be cut into the outer layer 351 in order for the ambient temperature sensor 150 to function properly. All other elements of the watchband can remain the same. The flexible circuit board 310, with its embedded sensors and connections, can sandwich between the body-contacting layer 350 and outer layer 351 of watchband material.

Figure 3:
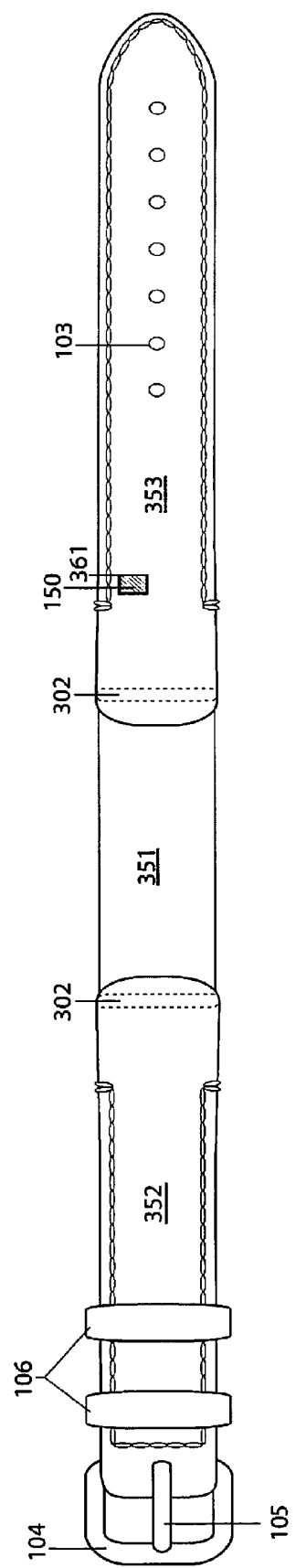
FIG. 3 is a top view of a watchband with integrated electronics without a timepiece, according to an embodiment.

FIG. 3 is a top view of a watchband with integrated electronics without a timepiece, according to an embodiment. The first timepiece connection layer 352 and the second timepiece connection layer 353 of watchband material can be connected atop the outer layer 351 of watchband material, and the outer layer 351 can be connected to the body-contacting layer (not shown) such that the edges of each layer are aligned. The flexible circuit board (not shown) is not visible when the watchband is assembled. The tang holes 103 can penetrate all three watchband material layers, in order for the tang clasp 104 tang 105 to fully secure the watchband 100 on a user's wrist. A portion of the outer layer 351 can be left uncovered by the first connection layer 352 and the second connection layer 353, with the portion being large enough to admit the length of a standard timepiece (a timepiece length). The timepiece (not shown) can be placed between the first connection layer 352 and the second connection layer 353 such that the timepiece (not shown) covers the exposed portion of the outer layer 351 and faces outwards. Also visible is the ambient temperature sensor 150, which can be exposed to the ambient atmosphere through the ambient temperature sensor hole 361 cut into the second connection layer 363.

Figure 4:
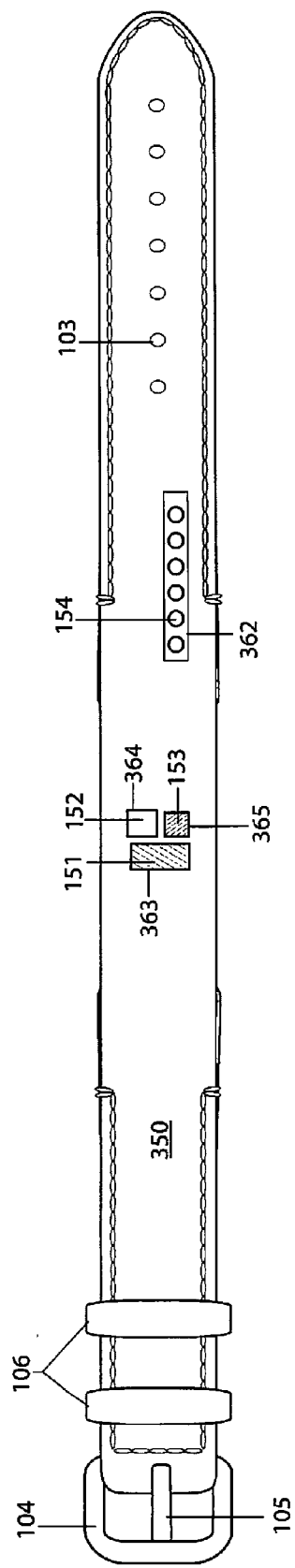
FIG. 4 is a bottom view of a watchband with integrated electronics without a timepiece, according to an embodiment.

FIG. 4 is a bottom view of a watchband with integrated electronics without a timepiece, according to an embodiment. As in the top view, the first timepiece connection layer (not shown) and the second timepiece connection layer (not shown) of watchband material can be connected atop the outer layer (not shown) of watchband material, and the outer layer (not shown) can be connected to the body-contacting layer 350 such that the edges of each layer are aligned. From this view, the body temperature sensor 151, heart rate sensor LED 152, heart rate sensor photodiode 153, and charging port 154 can be seen through the body temperature sensor hole 303, LED hole 364, photodiode hole 365, and charging port hole 362, respectively.

Figure 5:
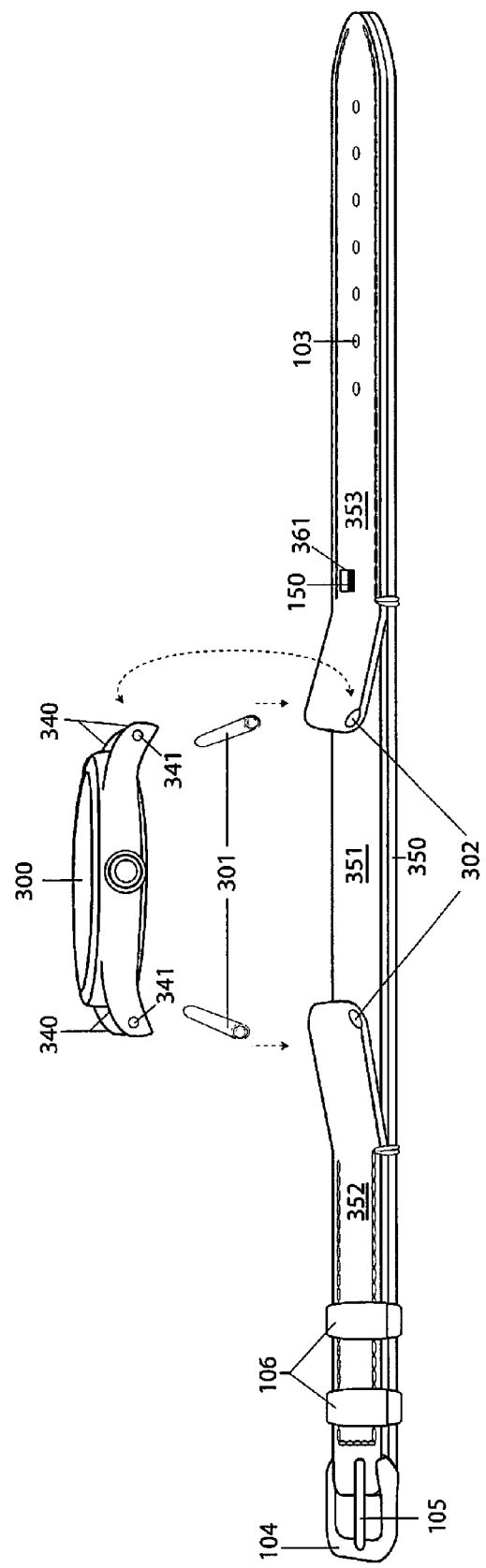
FIG. 5A is a perspective view of a watchband with integrated electronics having a timepiece attached, according to an embodiment.
FIG. 5B is a perspective view of a watchband with integrated electronics having a timepiece attached, according to an alternate embodiment.
Figure 5:
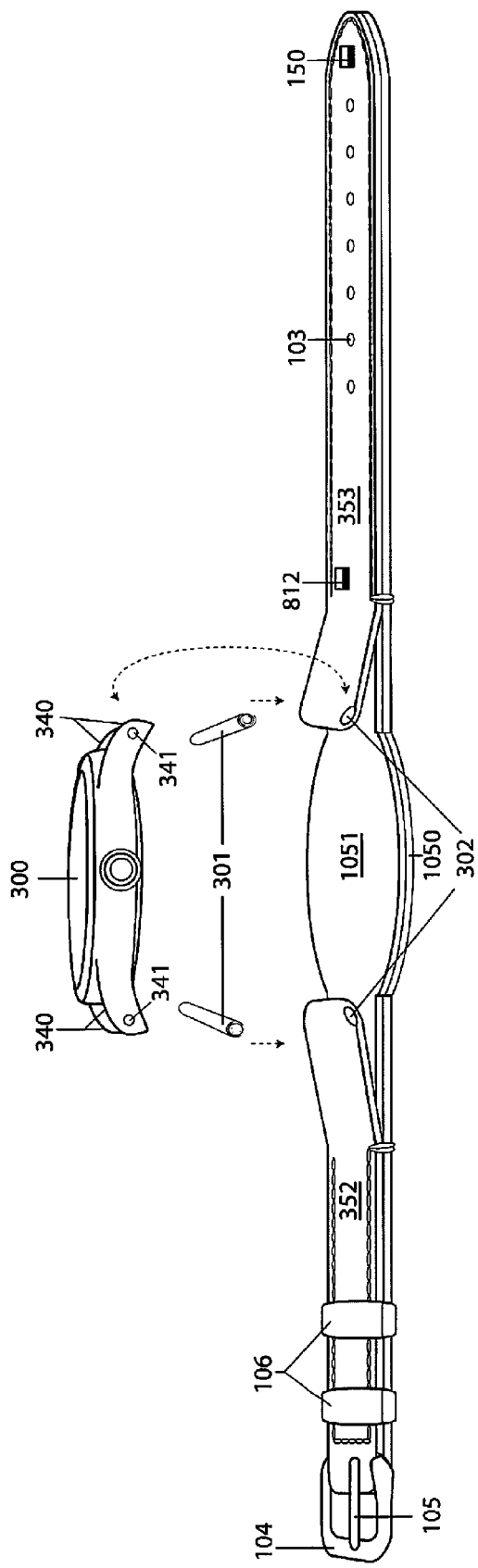

FIG. 5A is a perspective view of a watchband with integrated electronics 100 having a timepiece 300 attached, according to an embodiment. In this view, the body-contacting layer 350, outer layer 351, and timepiece connection layers 352, 353 can be assembled such that the flexible circuit board (not shown) is not visible. From this view, the ambient temperature sensor 150 can be obliquely visible through the ambient temperature sensor hole 361.

Any standard mechanical or digital timepiece 300 can be used with the watchband. The timepiece 300 can be held in place by timepiece joints 301 hidden within connection channels 302 located on the first connection layer 352 and second connection layer 353 of watchband material. The timepiece joints 301 can be hollow tubes, with sufficient diameter to admit a screw or pin (not shown), and can be made from plastic or metal. The timepiece 300, which can have mounting supports 340 having mounting holes 341, can fit such that the timepiece connection channels 302, having the timepiece joints 301 inside, align with the mounting support 340 and the mounting holes 341. The user can add the screws or pins to the mounting holes 341 in order to secure the timepiece 300 to the timepiece joints 301 and the timepiece connection layers 352, 353. In order to change out the timepiece 300, the user would remove the screws or pins from the mounting holes 341, replace the timepiece 300 with an alternate timepiece (not shown), and re-add the screws or pins to the alternate mounting holes (not shown).

FIG. 5B is a perspective view of a watchband with integrated electronics having a timepiece 300 attached, according to an alternate embodiment. In an alternate embodiment, the body contacting layer 1050 and the outer layer 1051 can both have a bulged middle that can occlude the timepiece 300 when seen from the bottom. The function of the various peripherals (heart rate sensor, temperature sensors, air quality sensor, etc.) are the same as in other embodiments. In an alternate embodiment, the ambient temperature sensor 150 is located further away from the timepiece 300, in order to provide a more accurate reading of the ambient temperature.

Figure 6:
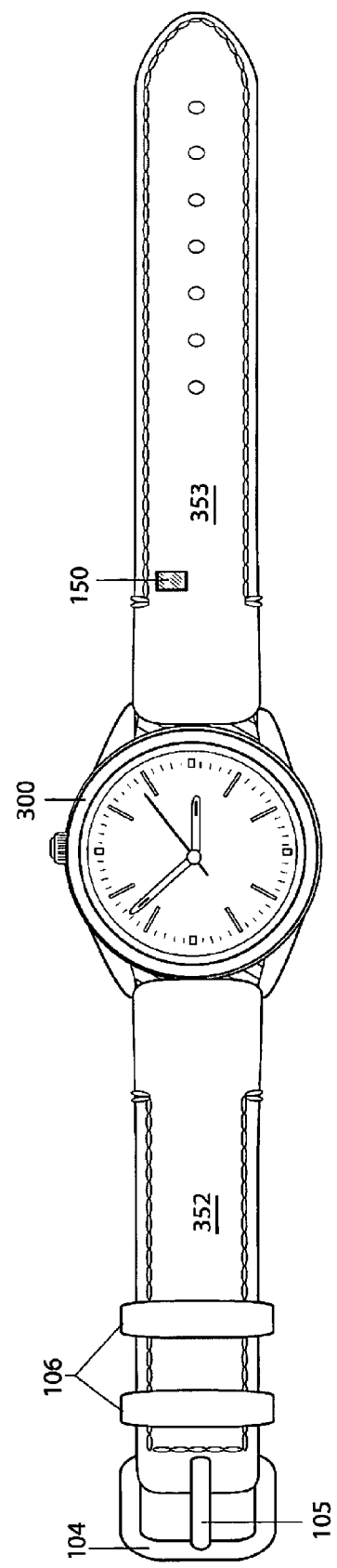
FIG. 6 is a top view of a watchband with integrated electronics with a timepiece, according to an embodiment.

FIG. 6 is a top view of a watchband with integrated electronics with a timepiece, according to an embodiment. In this view, the timepiece 300 can cover the previously exposed portion of the outer layer 351 of watchband material. The first timepiece connection layer 352 and second timepiece connection layer 353 can be spaced such that the timepiece 300 is easily admitted between the two connection layers 351, 352. If the timepiece 300 is replaced with an alternate timepiece (not shown) that is larger in length, the connection layers 351, 352 are flexible, allowing their ends to bend backward in order to admit the longer length of the alternate timepiece. Visible from this view can be the ambient temperature sensor 150.

Figure 7:
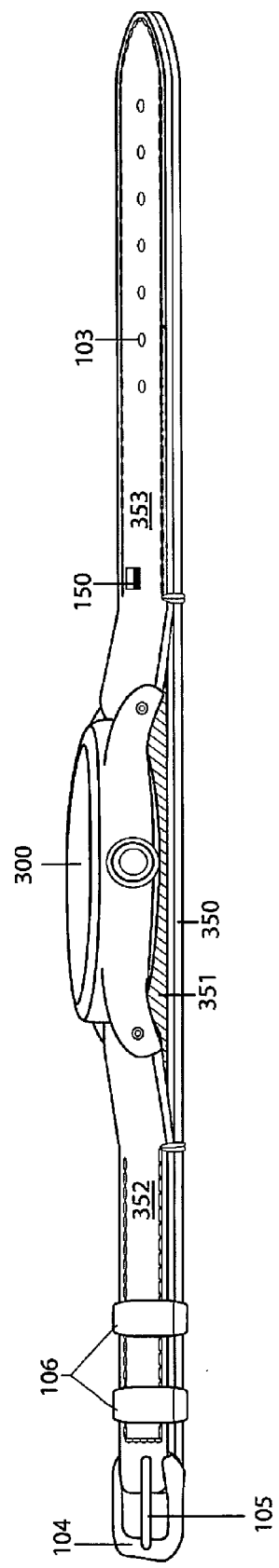
FIG. 7 is a side view of a watchband with integrated electronics with a timepiece, according to an embodiment.

FIG. 7 is a side view of a watchband with integrated electronics with a timepiece, according to an embodiment. This view further illustrates how the timepiece 300 can cover the previously exposed portion of the outer layer 351 of watchband material. As the body-contacting layer 350 and outer layer 351 are assembled in this view, the flexible circuit board (not shown), as well as the majority of the embedded circuity, is not visible. However, the ambient temperature sensor 150 can be seen through the ambient temperature sensor hole 361.

Figure 8:
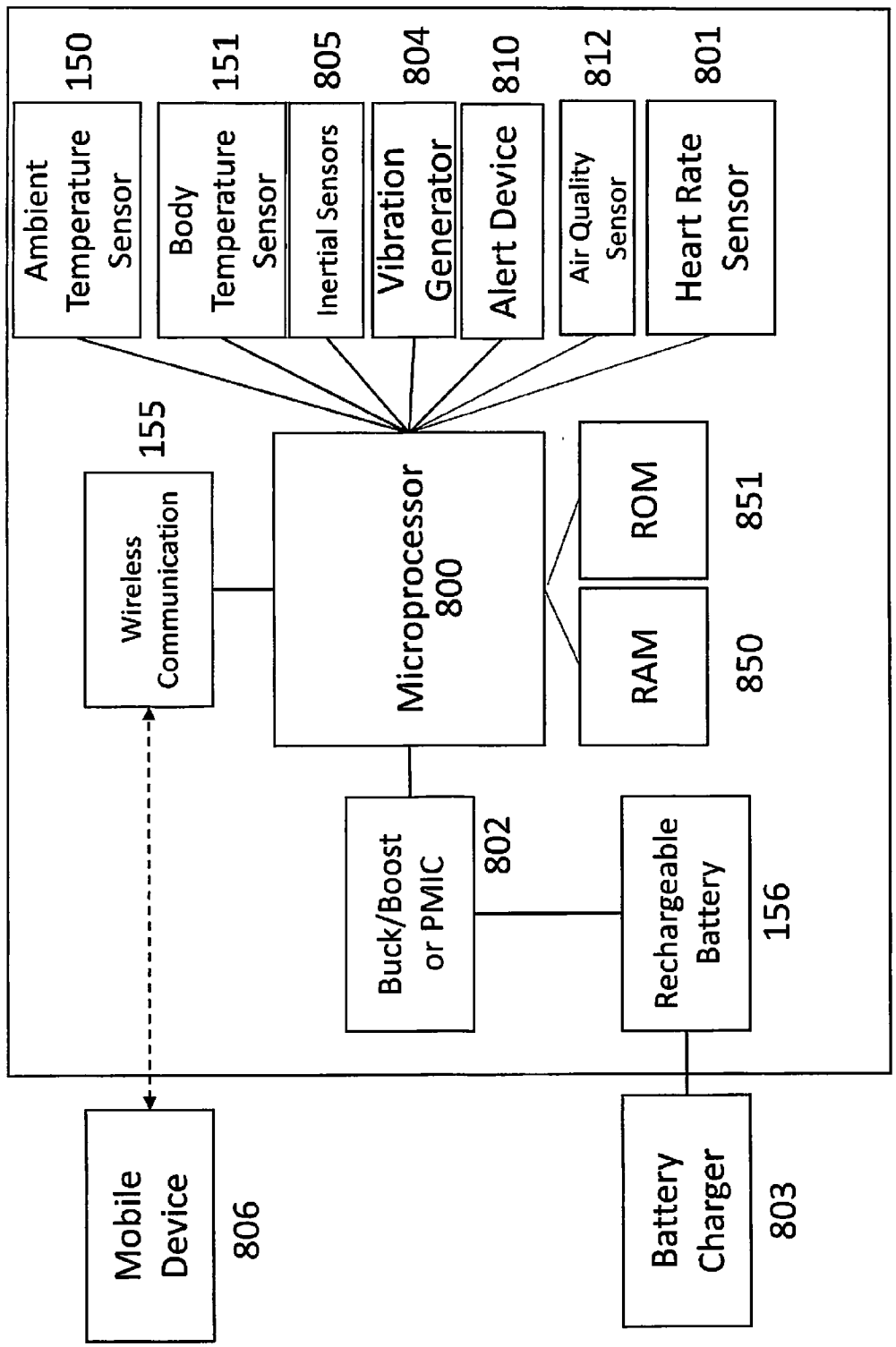
FIG. 8 is a block diagram illustrating the features and peripherals of a watchband with integrated electronics, according to an embodiment.

FIG. 8 is a block diagram illustrating the features and peripherals of a watchband with integrated electronics, according to an embodiment. The watchband's sensors and functionality can primarily be controlled by a microprocessor 800 having the capability to interact with the various sensors, as well as input and output communication information. The microprocessor 800 can draw a small amount of power, in order for the watchband to avoid frequent recharging. All peripherals can selectively communicate with the microprocessor 800. The microprocessor 800 can selectively activate or deactivate the watchband peripherals depending on the requirements of the user. A random access memory (RAM) module 850 can store all detected values from the peripherals before transmittal to the mobile device. A read-only memory (ROM) module 851 can store the watchband's basic input-output system (BIOS) and operating software (OS) needed for standard operations.

In addition to the heart rate sensor 801, the watchband can have two temperature sensors, a body temperature sensor 151 and an ambient temperature sensor 150, embedded on the flexible circuit board (not shown). The body temperature sensor 151 can face the side of the watchband facing the user's skin and be used to continuously monitor the user's body surface temperature. The ambient temperature sensor 150 can face the side of the watchband facing the world, and be used to continuously monitor the ambient temperature. Both temperature sensors 150, 151 can be thermocouples, thermistors, or a combination thereof.

The watchband can have a wireless communication device 155 for communications between the watchband and a user's mobile device 806. The user's mobile device 806 can include a cellular phone, personal computer, tablet, medical device, internet router, integrated telemetry device, or other wirelessly communicating device. The wireless communication device 155 can be a Bluetooth transceiver, an IEEE 802.11 transceiver, radio transceiver, or other wireless communication mechanism. The wireless communication device 155 can have a small physical profile, low power consumption, and durable construction. The wireless communication device can additionally include a near field communication (NFC) chip, allowing for communication between the watchband and mobile device 806 when placed in close physical proximity. The mobile device 806 can run an application that can receive, display, and store data from all peripheral devices on the watchband.

The watchband can be powered by a rechargeable battery 156. The rechargeable battery 156 can be lithium-ion, lithium-polymer, nickel-cadmium, nickel-hydrogen, nickel-zinc, thin film lithium, or other metallic combination thereof. The battery 156 can be small in profile, and able to hold a charge for an extended period of time. The battery 156 can be attached to the flexible circuit board by a series of metallic battery connections (not shown). The battery 156 can be recharged using a battery charger 803, which can interact directly with the watchband at a charging port (not shown), which can be a series of metal contacts. The battery charger can be connected to the charging port using magnets, physical clasps, or wireless induction. In order to maintain performance of the watchband at various states of charge, a buck-boost DC-DC converter 802 can be used to keep the output voltage constant. Alternatively, a power management circuit (PMIC) 802 can be included in the watchband in place of the buck-boost DC-DC converter, which can regulate battery charging, voltages rates, activation control, and other features.

The watchband can also contain a set of inertial sensors 805, including an accelerometer, gyroscope, and compass. The inertial sensors 805 can be devices used to determine the watchband's position and orientation, and whether or not the watchband is being subjected to any acceleration forces along any of the major three axis of movement. The inertial sensors 805 can allow the watchband to act as a pedometer and a physical activity measurement tool. Additionally, the inertial sensors 805 can be tied into the watchband's power management software, allowing for the watchband to enter a low power state mode when not in use and to be woken when movement is again detected. Similarly, the inertial sensors 805 can be used to increase another watchband sensor's accuracy. For example, if too much motion activity makes readings from the heart rate sensor 801 unreliable, the measurements from the inertial sensors can trigger a shutdown of the heart rate sensor 801 until such motion has ceased.

The watchband can also contain a vibration generator 804 that vibrates when power is applied. The vibration generator 804 can be a small piezoelectric crystal that vibrates under power. The vibration generator 804 can be controlled by a metal-oxide-semiconductor field-effect transistor (MOSFET), which can be activated by the microcontroller 800 to convey customizable and specific tactile notification to the user, such as informing if the device's power is turned on or off, incoming phone calls, emails, or text messages, or if a pre-set heart rate or temperature is being exceeded.

The watchband can also contain an air quality sensor 812 that can be used to detect the ambient humidity and air quality, or can be used to determine levels of pollutants in the atmosphere, such as smog, radon, carbon monoxide, or other contaminants. The air quality sensor 812 can be chemical or electrical.

The watchband can also contain an alert device 810 that can be configured to contact a predesignated emergency service through wireless communication when activated. The emergency service can be 911, a private security service, fire service, ambulance service, or, in the case of a medical facility, an emergency page service for the health care professionals. The alert device can be a depressible button or switch, but can be constructed such that the device is not easily toggled, to prevent false alarms.

Figure 9:
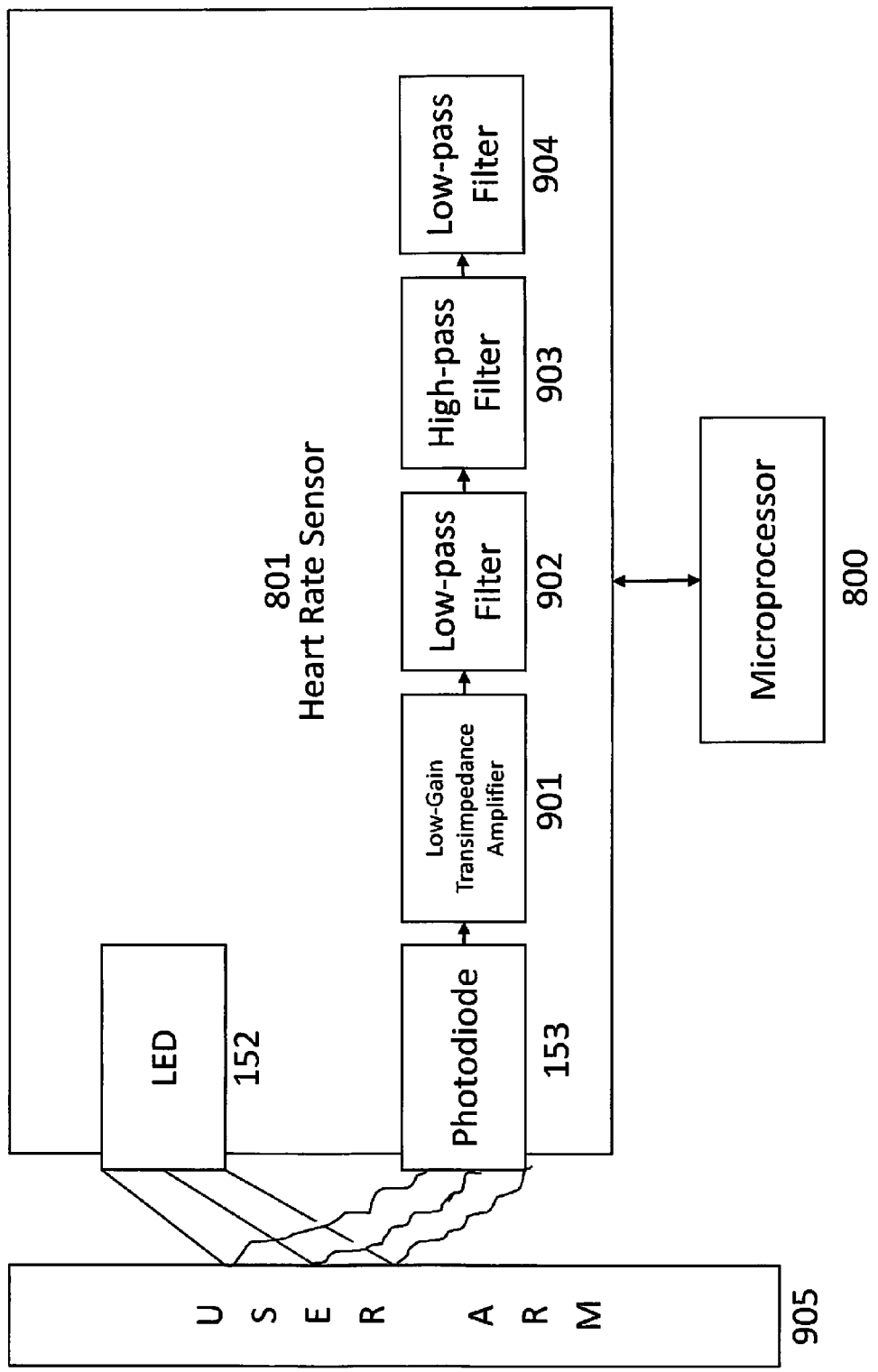
FIG. 9 is a flowchart diagram illustrating the functional components of a heart rate sensor, according to an embodiment.

FIG. 9 is a flowchart diagram illustrating the functional components of a heart rate sensor 801, according to an embodiment. In an embodiment, the watchband can have an integrated heart rate sensor 801 connected to the flexible circuit board (not shown). The heart rate sensor 801 can be a photoplethysmograph optical sensor, which uses a light-emitting diode (LED) 152 and a photodiode 153 in conjunction in order to measure changes in the user's blood flow. As light from the LED 152 shines onto the user's arm 905, its detected intensity changes as the amount of blood flow changes during the user's heart's systolic and diastolic function. These intensity changes can be read by the photodiode 153. The photodiode 153 signal can be amplified with a low gain transimpedance amplifier 901, producing a voltage signal. In an embodiment, the signal gain can be kept low so as to reduce signal noise in the amplification stage. To filter noise, the signal can be passed through a low-pass second order filter 902, followed by a low-cutoff frequency high-pass filter 903, and followed again by a second low-pass filter 904 to remove any remaining noise, at which point the filtered signal can be sent to the microcontroller 800. The order and amount of filters can be altered to alter the signal output of the heart rate sensor 801, and is not limited to the description provided above. All filters can be built with operational amplifiers (op-amps).

Figure 10:
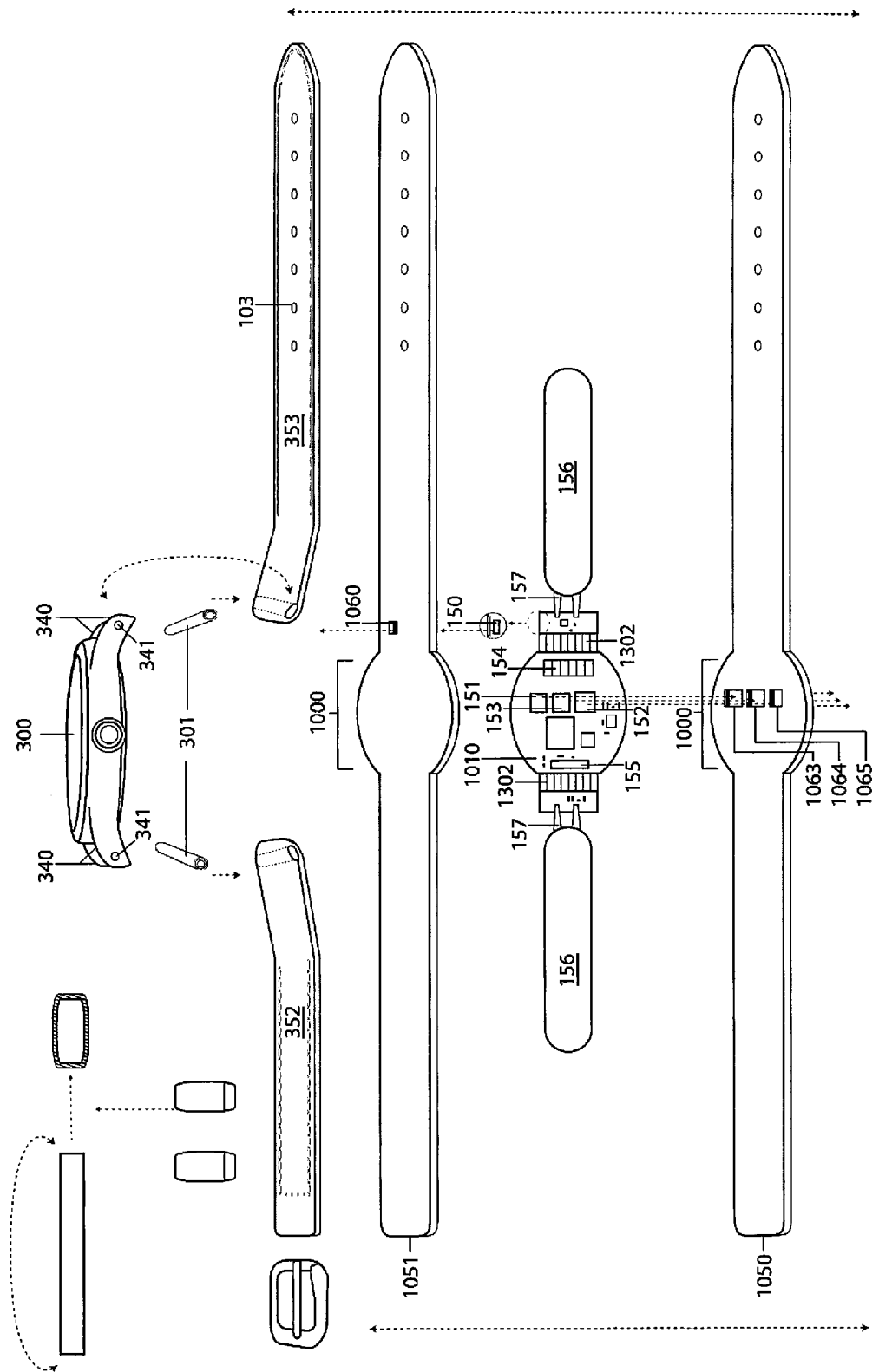
FIG. 10A is an exploded view of a watchband with integrated electronics with a timepiece, according to an alternate embodiment.
FIG. 10B is an exploded view of a watchband with integrated electronics with a timepiece, according to an alternate embodiment.
Figure 10:
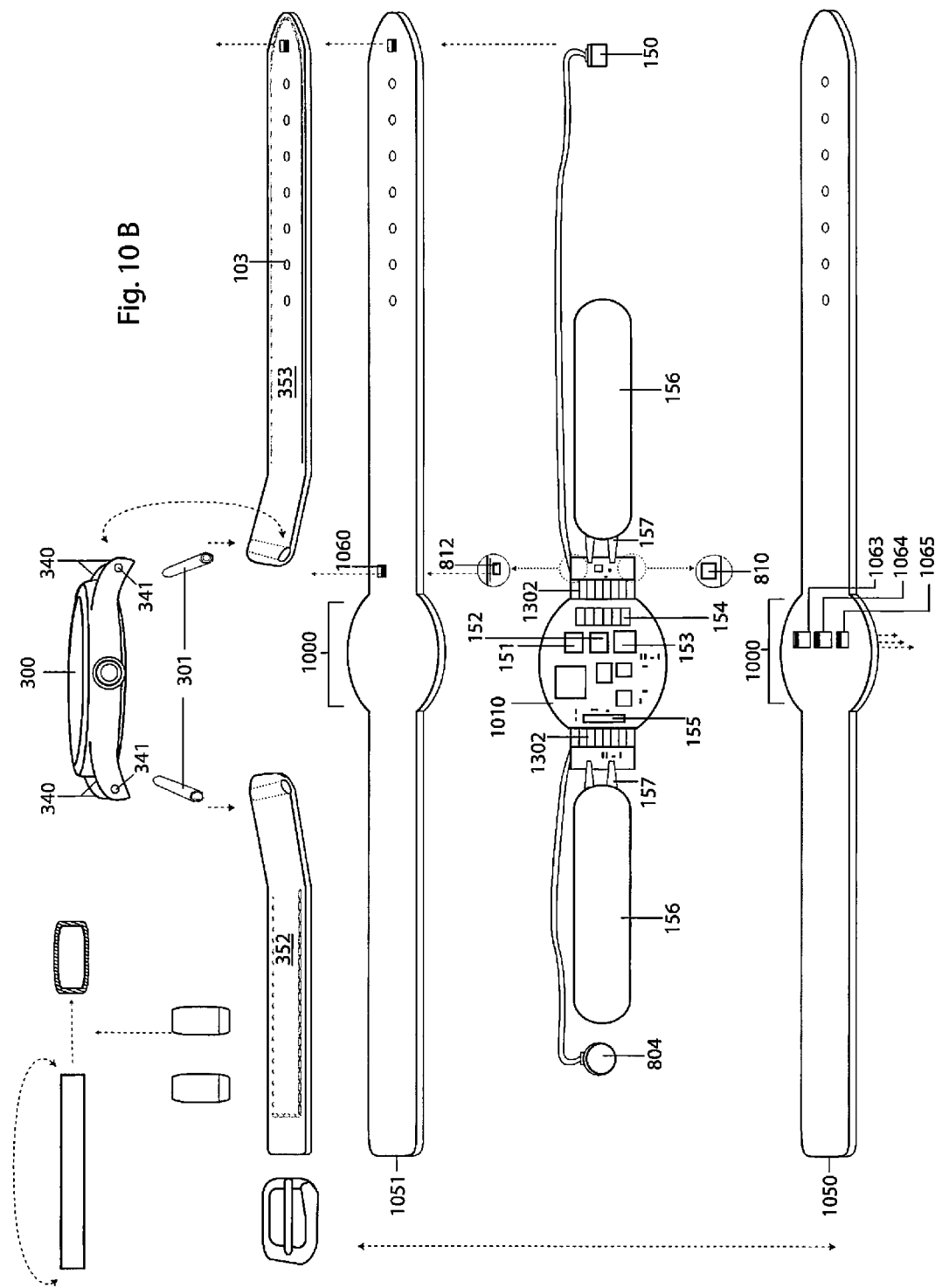

FIG. 10A is an exploded view of a watchband with integrated electronics with a timepiece, according to an alternate embodiment. In an alternate embodiment, the body contacting layer 1050 and the outer layer 1051 can both have a bulged middle 1000 that can occlude the timepiece 300 when seen from the bottom. The flexible circuit board 1010 can be formed in a bulged geometry to mimic the geometry of the body contacting layer 1050 and the outer layer 1051. The body temperature sensor 151, LED 152, and photodiode 153 can function similarly in all embodiments, but can be placed on the flexible circuit board 1010 to fully take advantage of the board's 1010 geometry. Likewise, the body temperature sensor hole 1065, LED hole 1064, and photodiode hole 1063 can all be cut into the body contacting layer 1050 of watchband material to match their respective sensors' positions on the flexible circuit board 1010.

The flexible circuit board 1010 can have flexible connectors 1302, which allow for more flexibility between the flexible circuit board 1010, and the one or more rechargeable batteries 156 that can power the flexible circuit board 1010 through the one or more battery connections 157. The flexible circuit board 1010 can be made of a rigid circuit material 1301, which can necessitate its placement entirely between the bulged middles 1000 of the outer layer 1051 and the body contacting layer 1050 of watchband material, placing the flexible circuit board entirely underneath the timepiece 300, with the one or more rechargeable batteries 156 extending outwards within the watchband.

FIG. 10B is an exploded view of a watchband with integrated electronics with a timepiece, according to an alternate embodiment. In an alternate embodiment, the ambient temperature sensor 150 can be remotely connected to the flexible circuit board 1010 such that the ambient temperature sensor is placed further down the watchband, away from the rest of the peripherals, in order to more accurately measure the ambient air temperature. The watchband can also include a vibration generator 804, which can generate vibrational pulses based on the commands sent from the microprocessor.

Figure 11:
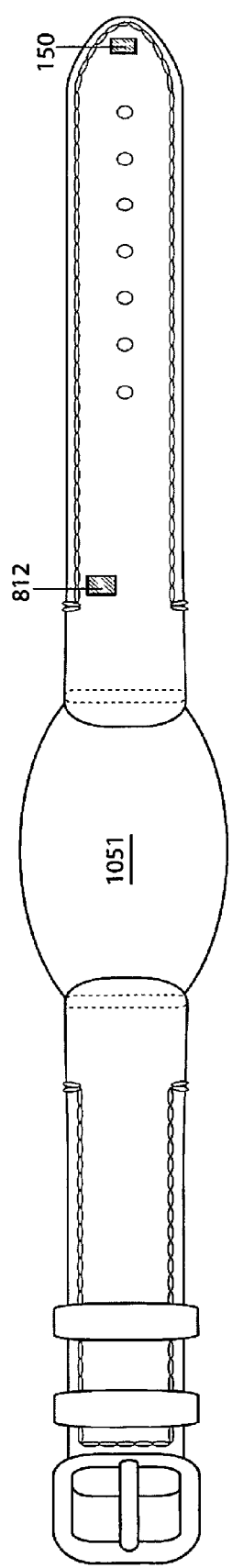
FIG. 11 is a top view of a watchband with integrated electronics without a timepiece, according to an alternate embodiment.

FIG. 11 is a top view of a watchband with integrated electronics without a timepiece, according to an embodiment. In an alternate embodiment, both the outer layer 1051 and body contacting layer (not shown) of watchband material can be created with a bulged middle 1000 such that there can be a greater amount of surface area covered by the layers of watchband material. The position of the ambient temperature sensor 150, along with the ambient temperature sensor hole 360, can remain the same as in other embodiments.

Figure 12:
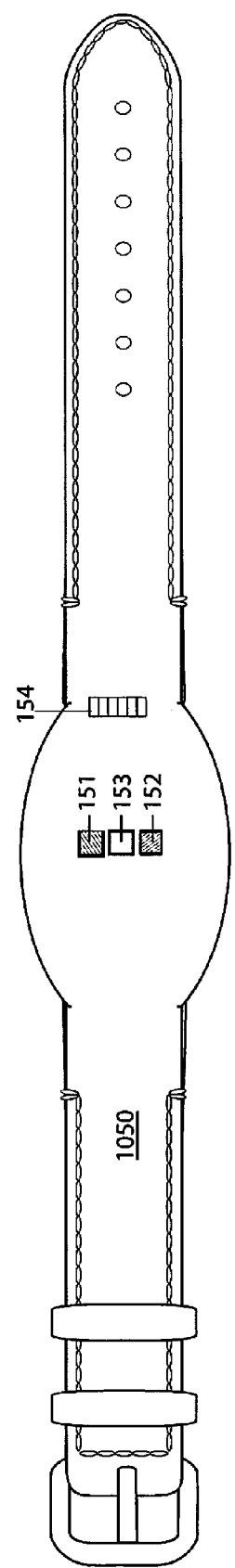
FIG. 12 is a bottom view of a watchband with integrated electronics without a timepiece, according to an alternate embodiment.

FIG. 12 is a bottom view of a watchband with integrated electronics without a timepiece, according to an embodiment. In an alternate embodiment, both the outer layer (not shown) and body contacting layer 1050 of watchband material can be created with a bulged middle 1000 such that there can be a greater amount of surface area covered by the layers of watchband material. The body temperature sensor 151, LED 152, and photodiode 153 can be positioned linearly, or in any desired configuration. The position of the metal contacts 154 can remain the same as in other embodiments.

Figure 13:
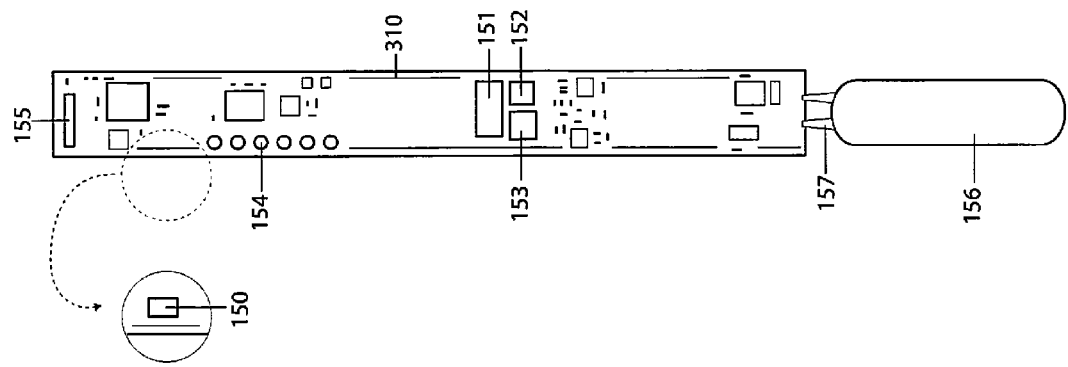
FIG. 13A is a top view of a flexible circuit board for a watchband with integrated electronics, according to an alternate embodiment.
FIG. 13B is a top view of a flexible circuit board for a watchband with integrated electronics, according to an alternate embodiment.
FIG. 13C is a top view of a flexible circuit board for a watchband with integrated electronics, according to an alternate embodiment.
FIG. 13D is a top view of a flexible circuit board for a watchband with integrated electronics, according to an alternate embodiment.
Figure 13:
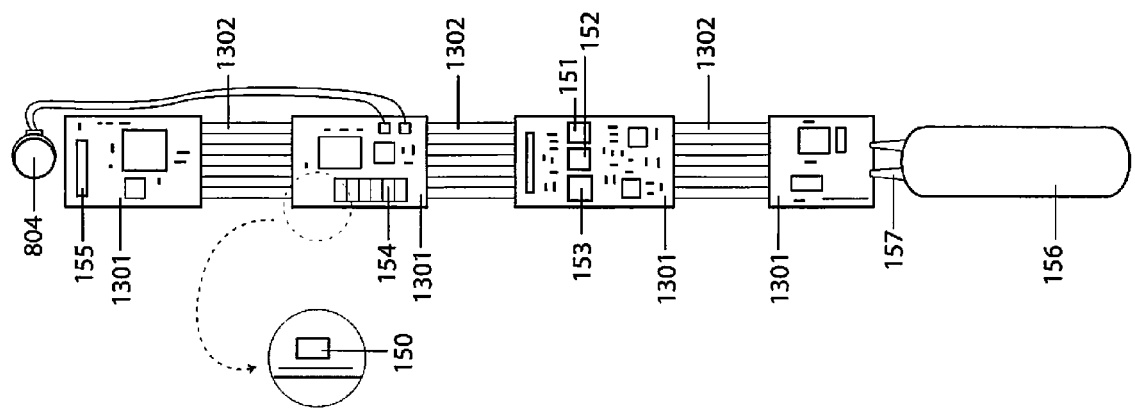
Figure 13:
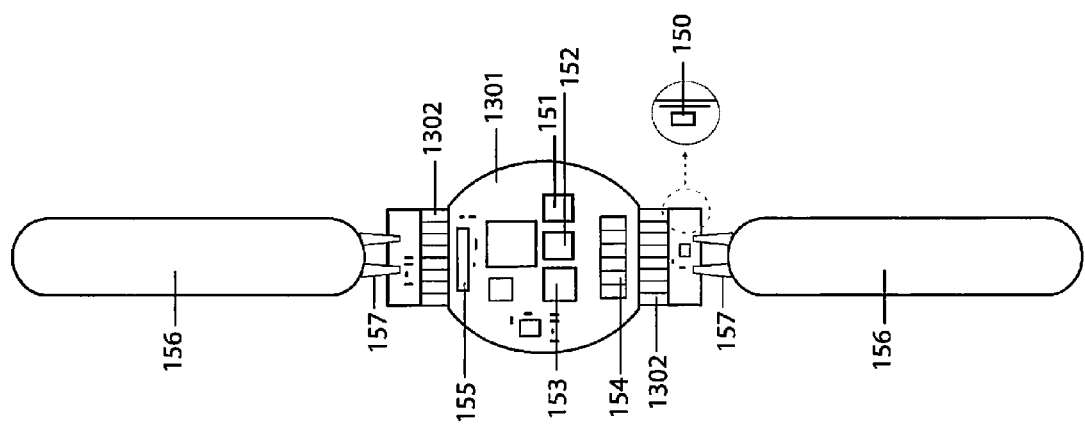
Figure 13:
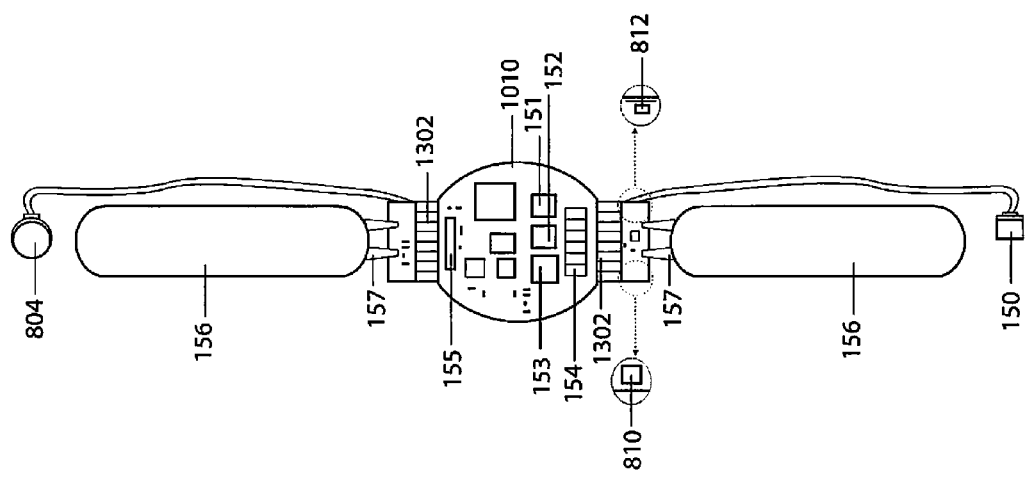

FIG. 13A is a top view of a flexible circuit board for a watchband with integrated electronics, according to an embodiment. The flexible circuit board 310 can be a printed circuit board that allows for the same level of electrical connection fidelity between components as a regular circuit board, but can be manufactured out of materials allowing for the circuit board to be able to bend and flex dramatically more than a regular surface board would allow whilst still retaining those electrical connections. The flexible circuit board 310 can have preprinted connection points for the soldering of components for ease of manufacturing. Embedded on the flexible circuit board 310 can be a variety of sensors devoted to the measurement of various bodily functions, health criteria, and device information. These sensors can be connected to a central microprocessor (not shown), which can be used as the computational hub of the watchband.

In an embodiment, the watchband can have an integrated heart rate sensor connected to the flexible circuit board 310. The heart rate sensor can be a photoplethysmograph optical sensor, which uses a light-emitting diode (LED) 152 and a photodiode 153 in conjunction in order to measure changes in the user's blood flow. As light from the LED 152 shines onto the user's skin, its detected intensity changes as the amount of blood flow changes during the heart's systolic and diastolic function. These intensity changes can be read by the photodiode 153. The photodiode 153 signal can be amplified using a series of filters (not shown).

In addition to the heart rate sensor, the watchband can have two temperature sensors, a body temperature sensor 151 and an ambient temperature sensor 150, embedded on the flexible circuit board 310. The body temperature sensor 151 can face the side of the watchband facing the user's skin and be used to continuously monitor the user's body surface temperature. The ambient temperature sensor 150 can face the side of the watchband facing the world, and be used to continuously monitor the ambient temperature. Both temperature sensors 150, 151 can be thermocouples, thermistors, semiconductors, digital integrated sensors, or a combination thereof.

The watchband can have a wireless communication device 155 for communications between the watchband and a user's mobile device (not shown). The wireless communication device 155 can be a Bluetooth transceiver, an IEEE 802.11 transceiver, radio transceiver, or other wireless communication mechanism. The wireless communication device 155 can have a small physical profile, low power consumption, and durable construction.

The watchband can be powered by a rechargeable battery 156. The rechargeable battery 156 can be lithium-ion, lithium-polymer, nickel-cadmium, nickel-hydrogen, nickel-zinc, thin film lithium, or other metallic combination thereof. The battery 156 can be small in profile, and able to hold a charge for an extended period of time. The battery 156 can be attached to the flexible circuit board 310 by a series of metallic battery connections 157. The battery 156 can be recharged using a battery charger (not shown), which can interact directly with the watchband at a charging port 154, which can be a series of metal contacts. The battery charger can be connected to the charging port using magnets, physical clasps, or wireless induction. In order to maintain performance of the watchband at various states of charge, a buck-boost DC-DC converter (not shown) can be used to keep the output voltage constant. Alternatively, a power management circuit (PMIC) can be included in the watchband in place of the buck-boost DC-DC converter, which can regulate battery charging, voltages rates, activation control, and other features.

FIG. 13B is a top view of a flexible circuit board for a watchband with integrated electronics, according to an alternate embodiment. In an alternate embodiment, the body temperature sensor 151, LED 152, photodiode 153, charging port 154, wireless communication device 155, and ambient temperature sensor 150 can all function in the same manner as previous embodiments, but can be placed in differing positions than other embodiments. The flexible circuit board can be divided into sections of rigid circuit material 1301 and flexible connection material 1302. The modular construction of the alternate flexible circuit board allows for greater flexion around a user's wrist (not shown). All sensors 150, 151, 152, 153, 154, 155 can be connected to the watchband on the rigid circuit material 1301. Additionally, a vibration generator 804 can be connected to the flexible circuit board.

FIG. 13C is a top view of a flexible circuit board for a watchband with integrated electronics, according to an alternate embodiment. In an alternate embodiment, the body temperature sensor 151, LED 152, photodiode 153, charging port 154, wireless communication device 155, and ambient temperature sensor 150 can all function in the same manner as previous embodiments. The flexible circuit board can have a large, rounded section of rigid circuit material 1010, which can be connected to one or more rechargeable batteries 156 by one or more sections of flexible connection material 1302.

FIG. 13D is a top view of a flexible circuit board for a watchband with integrated electronics, according to an alternate embodiment. In an alternate embodiment, the ambient temperature sensor 150 can be remotely connected to the flexible circuit board 1010 such that the ambient temperature sensor 150 is placed further down the watchband, away from the rest of the peripherals, in order to more accurately measure the ambient air temperature. The watchband can also include a vibration generator 804, which can generate vibrational pulses based on the commands sent from the microprocessor. The alternate embodiment can also include the alert button 810 and air quality sensor 812, which can function in the same manner as described in the other embodiments.

Although the present device has been described in terms of exemplary embodiments, none is limited thereto. Positions of all peripherals (temperature sensors, heart rate sensor, vibration generator, air quality sensor, alert device) can be altered, as well as the amount and location of the various filters, peripherals, and circuitry. No one peripheral is required on any one embodiment, rather, any combination of peripherals is contemplated. Rather, the appended claims should be construed broadly to include other variants and embodiments of the present apparatus, which may be made by those skilled in the art without departing from the scope and range of equivalents of either the apparatus or the methods for using such an apparatus.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top," and "bottom," as well as derivatives thereof should be construed to refer to the orientation as then described or as shown in the drawing under discussion. These relative terms are for convenience of description and do not require that the apparatus be constructed or operated in a particular orientation. Terms concerning attachments, coupling, and the like, such as "connected," and "interconnected," refer to a relationship wherein structures are secured or attached to one another either directly or indirectly through intervening structures, as well as both movable or rigid attachments or relationships, unless expressly described above.

What is claimed is:

1. A watchband with integrated electronics, comprising:
    a body-contacting layer of watchband material;
    an outer layer of watchband material;
    a first timepiece connection layer of watchband material;
    a second timepiece connection layer of watchband material;
    a flexible circuit board having a microcontroller and a wireless communication device configured to communicate with a mobile device;
    wherein the body-contacting layer of watchband material is attached to the outer layer of watchband material such that the flexible circuit, connected to a rechargeable battery, is sealed in between the body-contacting layer and the outer layer, and where the first timepiece connection layer and the second timepiece connection layer are attached atop the outer layer at a timepiece length.

2. The watchband as recited in claim 1, wherein:
    the flexible circuit board further comprises a heart rate sensor having a light-emitting diode and a photodiode; and
    the body-contacting layer of watchband material further comprises a light-emitting diode hole and a photodiode hole;
    the flexible circuit board being positioned between the body-contacting layer and outer layer of watchband material such that the light-emitting diode overlaps the light-emitting diode hole and the photodiode overlaps the photodiode hole.

3. The watchband as recited in claim 1, wherein:
    the flexible circuit board further comprises a body temperature sensor; and
    the body-contacting layer of watchband material further comprises a body temperature sensor hole;
    the flexible circuit board being positioned between the body-contacting layer and outer layer of watchband material such that the body temperature sensor overlaps the body temperature sensor hole.

4. The watchband as recited in claim 1, wherein:
    the flexible circuit board further comprises an ambient temperature sensor;
    the outer layer of watchband material further comprises an ambient temperature sensor hole; and
    the second timepiece connection layer of watchband material further comprises an ambient temperature sensor hole;
    the flexible circuit board being positioned between the body-contacting layer and outer layer of watchband material such that the ambient temperature sensor overlaps the ambient temperature sensor hole of the outer layer of watchband material and the ambient temperature sensor hole of the second timepiece connection layer of watchband material.

5. The watchband as recited in claim 1, further comprising an ambient temperature sensor, wherein:
    the ambient temperature sensor remotely connects to the flexible circuit board;
    the outer layer of watchband material further comprises an ambient temperature sensor hole; and
    the second timepiece connection layer of watchband material further comprises an ambient temperature sensor hole;
    the ambient temperature sensor being positioned between the body-contacting layer and outer layer of watchband material such that the ambient temperature sensor overlaps the ambient temperature sensor hole of the outer layer of watchband material and the ambient temperature sensor hole of the second timepiece connection layer of watchband material.

6. The watchband as recited in claim 1, further comprising an alert device;
    the alert device configured to contact an emergency service when activated.

7. The watchband as recited in claim 1, wherein:
    the flexible circuit board further comprises an air quality sensor;
    the outer layer of watchband material further comprises an air quality sensor hole; and
    the second timepiece connection layer of watchband material further comprises an air quality sensor hole;
    the flexible circuit board being positioned between the body-contacting layer and outer layer of watchband material such that air quality sensor overlaps the air quality sensor hole of the outer layer of watchband material and the air quality sensor hole of the second timepiece connection layer of watchband material.

8. The watchband as recited in claim 1, wherein:
    the flexible circuit board further comprises an inertial sensor configured to detect acceleration in any direction.

9. The watchband as recited in claim 1, wherein:
the flexible circuit board further comprises a vibration generator configured to produce vibration at the direction of the microcontroller.

10. The watchband as recited in claim 1, further comprising one or more rechargeable battery and a battery charger, wherein:
the flexible circuit board further comprises a charging port having metal contacts; and
the body-contacting layer of watchband material further comprises a charging port hole;
the flexible circuit board being positioned between the body-contacting layer and outer layer of watchband material such that the charging port overlaps the charging port hole, and the charging port is configured to connect to the battery charger such that the one or more rechargeable battery is recharged.

11. The watchband as recited in claim 1, further comprising one or more rechargeable battery and a battery charger, wherein:
the battery charger is configured to charge the one or more rechargeable battery wirelessly.

12. The watchband as recited in claim 1, wherein:
The one or more rechargeable battery further comprises a buck/boost DC-DC converter configured to regulate the voltage output of the one or more rechargeable battery.

13. The watchband as recited in claim 1, wherein:
The one or more rechargeable battery further comprises a power management circuit configure to regulate the voltage output of the one or rechargeable battery.

14. The watchband as recited in claim 1, wherein:
the first timepiece connection layer of watchband material further comprises a connection channel and a timepiece joint; and
the second timepiece connection layer of watchband material further comprises a connection channel and a timepiece joint;
the timepiece joint of the first timepiece connection layer fitted inside the connection channel of the first timepiece connection layer, and the timepiece joint of the second timepiece connection layer fitted inside the connection channel of the second timepiece connection layer.

15. The watchband as recited in claim 1, wherein the flexible circuit board further comprises rigid circuit material and one or more flexible connectors.

16. The watchband as recited in claim 1, wherein the outer layer of watchband material and the body contacting layer of watchband material further comprise a bulged middle.

17. A method of using a watchband with integrated electronics, comprising:
providing a watchband with integrated electronics comprising a body-contacting layer of watchband material; an outer layer of watchband material; a first timepiece connection layer of watchband material; a second timepiece connection layer of watchband material; a flexible circuit board having a microcontroller and a wireless communication device configured to communicate with a mobile device; and a rechargeable battery; wherein the body-contacting layer of watchband material is attached to the outer layer of watchband material such that the flexible circuit, connected to the rechargeable battery, is sandwiched in between the body-contacting layer and the outer layer, and where the first timepiece connection layer and the second timepiece connection layer are attached atop the outer layer at a length sufficient to admit a timepiece;
providing a timepiece;
securing the timepiece between the first timepiece connection layer and the second timepiece connection layer.

18. The method as recited in claim 17, further comprising:
providing an alternate timepiece;
unsecuring and removing the timepiece from the first timepiece connection layer and the second timepiece connection layer;
securing the alternate timepiece between the first timepiece connection layer and the second timepiece connection layer.

19. The method as recited in claim 17, further comprising:
communicating data between the microcontroller and the mobile device.

\* \* \* \* \*